United States Patent [19]

Benscoter

[11] Patent Number: 4,661,652
[45] Date of Patent: Apr. 28, 1987

[54] COMPOSITE HEADER/JUNCTION BOX

[75] Inventor: Richard D. Benscoter, Vienna, W. Va.

[73] Assignee: Butler Manufacturing Company, Kansas City, Mo.

[21] Appl. No.: 742,067

[22] Filed: Jun. 6, 1985

[51] Int. Cl.$^4$ .............................................. H02G 3/28
[52] U.S. Cl. ..................................................... 174/48
[58] Field of Search ...................... 174/48, 49; 52/221, 52/126.2

[56] References Cited

U.S. PATENT DOCUMENTS

| 2,930,504 | 3/1960 | Hudson | 174/48 X |
| 3,061,663 | 10/1962 | Reiland | 174/49 |
| 3,453,791 | 7/1969 | Fork | 52/221 |
| 3,549,781 | 12/1970 | Jones | 174/49 |

OTHER PUBLICATIONS

Gern, "SIK Underfloor Trunking System-Flush Incoming Supply Ducts", Electrocourier, vol. VII, No. 4, Dec. 1979, pp. 8, 9.

Primary Examiner—Arthur T. Grimley
Assistant Examiner—D. A. Tone
Attorney, Agent, or Firm—Frederick J. Olsson

[57] ABSTRACT

In an underfloor electrical distribution system, a feeder arrangement for directing power and communication conductors from one or more closets to the distribution runs of the system wherein a plurality of junction boxes are arranged in a line in end-to-end abutting relationship, each having interior means forming power and communication channels electrically isolating conductors respectively disposed therein from one another, the respective channels providing for power and communication conductors to enter through one end of the box and exit through an opposite end and/or to enter or to exit through one or more openings provided in one or both of the sides of the box.

7 Claims, 5 Drawing Figures

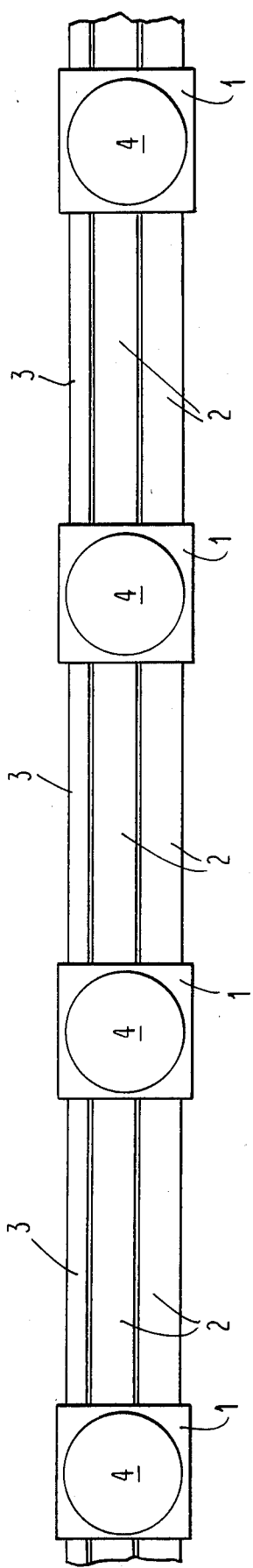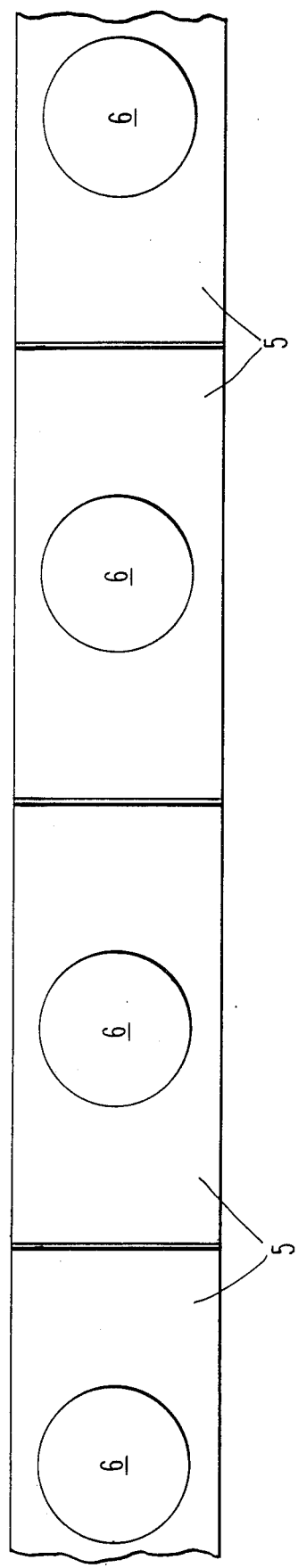
Fig. 1 PRIOR ART
Fig. 2

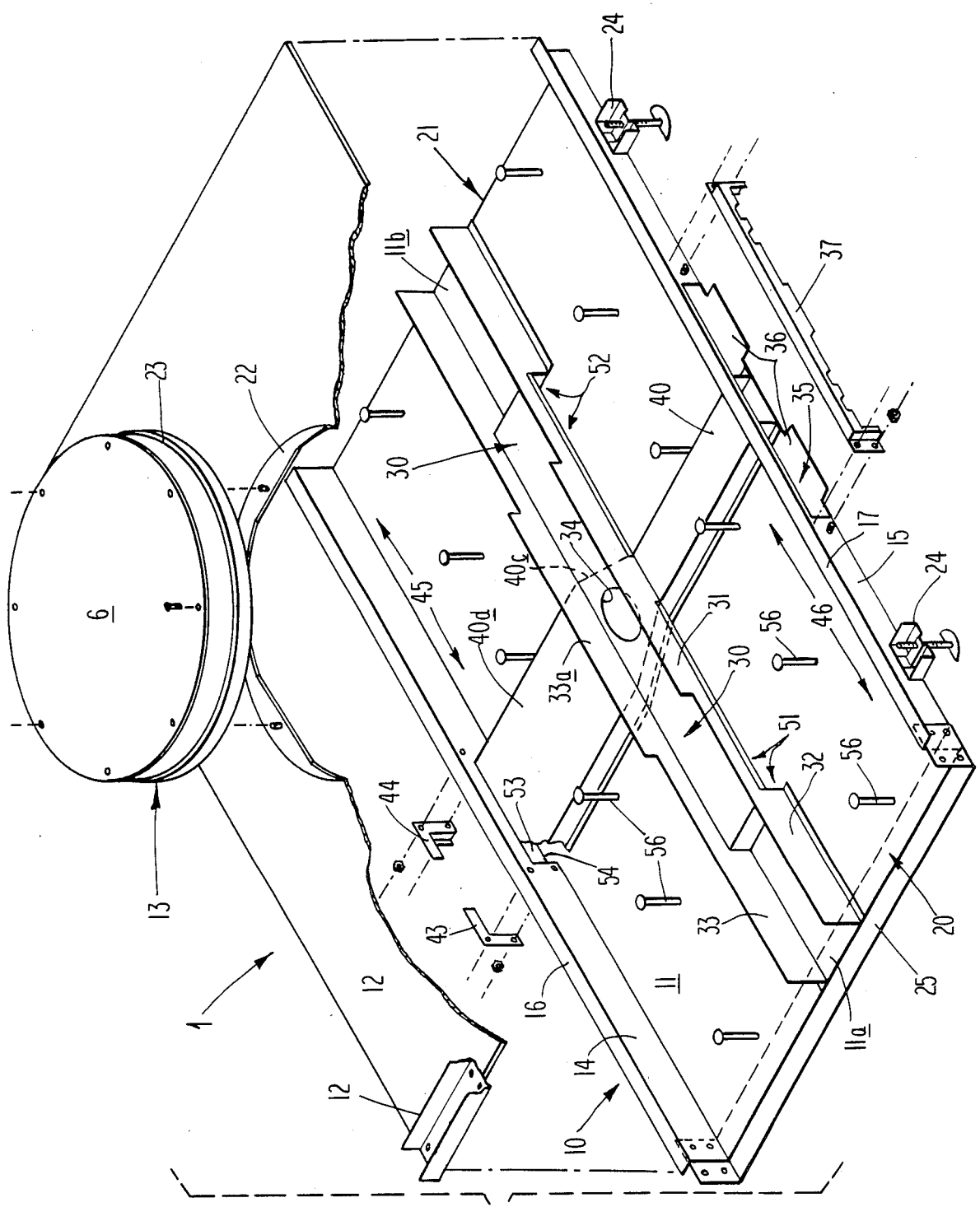

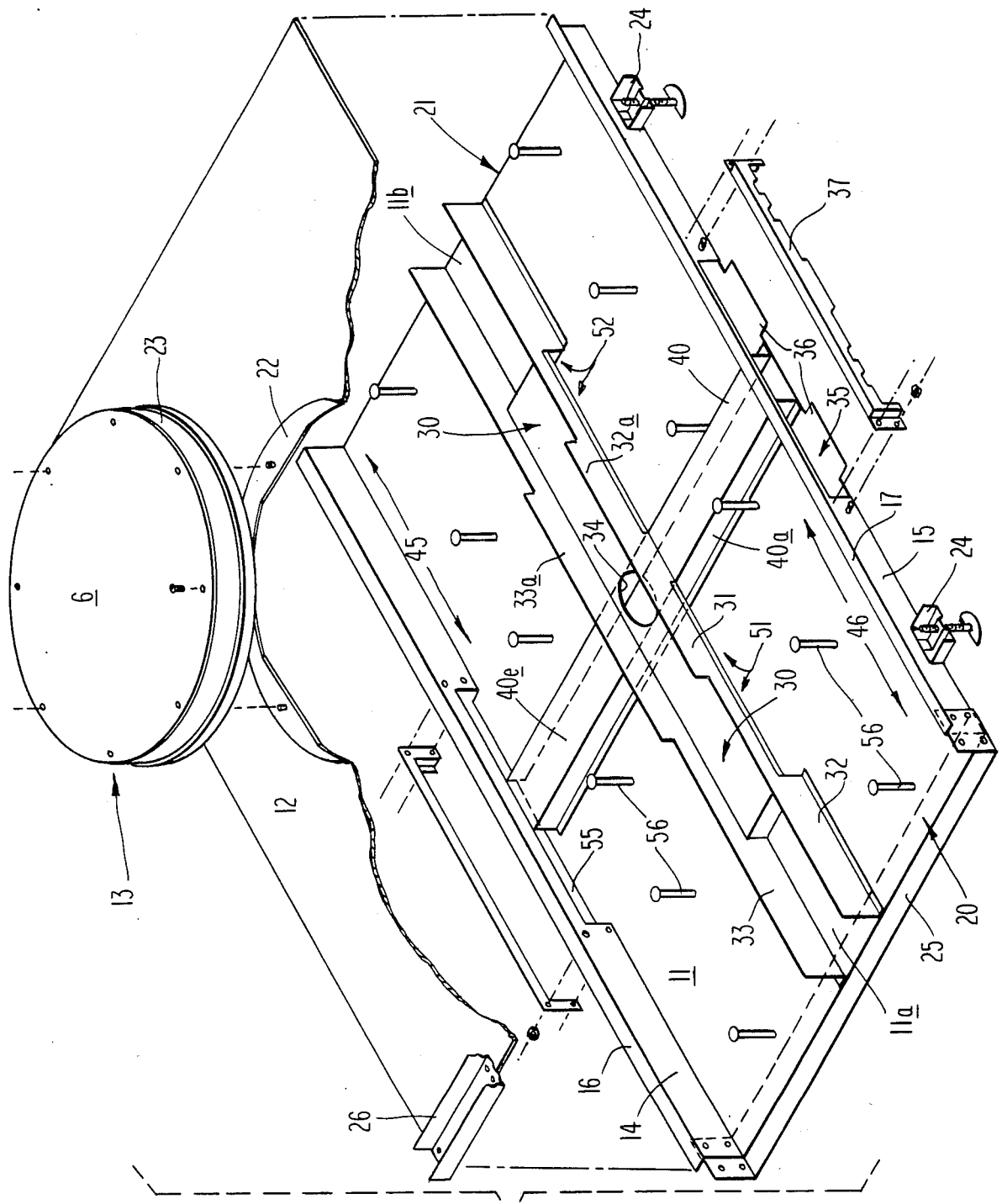

COMPOSITE HEADER/JUNCTION BOX

This invention relates to underfloor electrical distribution systems for reinforced concrete floors and in particular relates to an improved feeder arrangement for directing power and communication conductors from closets to the distribution runs.

The improved feed arrangement contemplates replacing the conventional headerduct/junction box type of feeder arrangement with boxes which are set up in a line in side-by-side abutting relationship and are structured to function as a header feeder and to serve as junction boxes. The foregoing is accomplished by the physical size of the boxes and a unique interior structure which isolates and directs the various power, communication, and data conductors.

The primary advantages of the invention are large savings in installation labor and approximately a threefold increase in capacity over a conventional system of equal cost.

The invention will be explained below in connection with the following drawings wherein:

FIG. 1 is a plan view of a conventional prior art header run arrangement comprising junction boxes and header ducts connected therebetween;

FIG. 2 is a plan view of the present arrangement comprising end-to-end boxes which constitute a header run and which serve as junction boxes;

Figure 3:
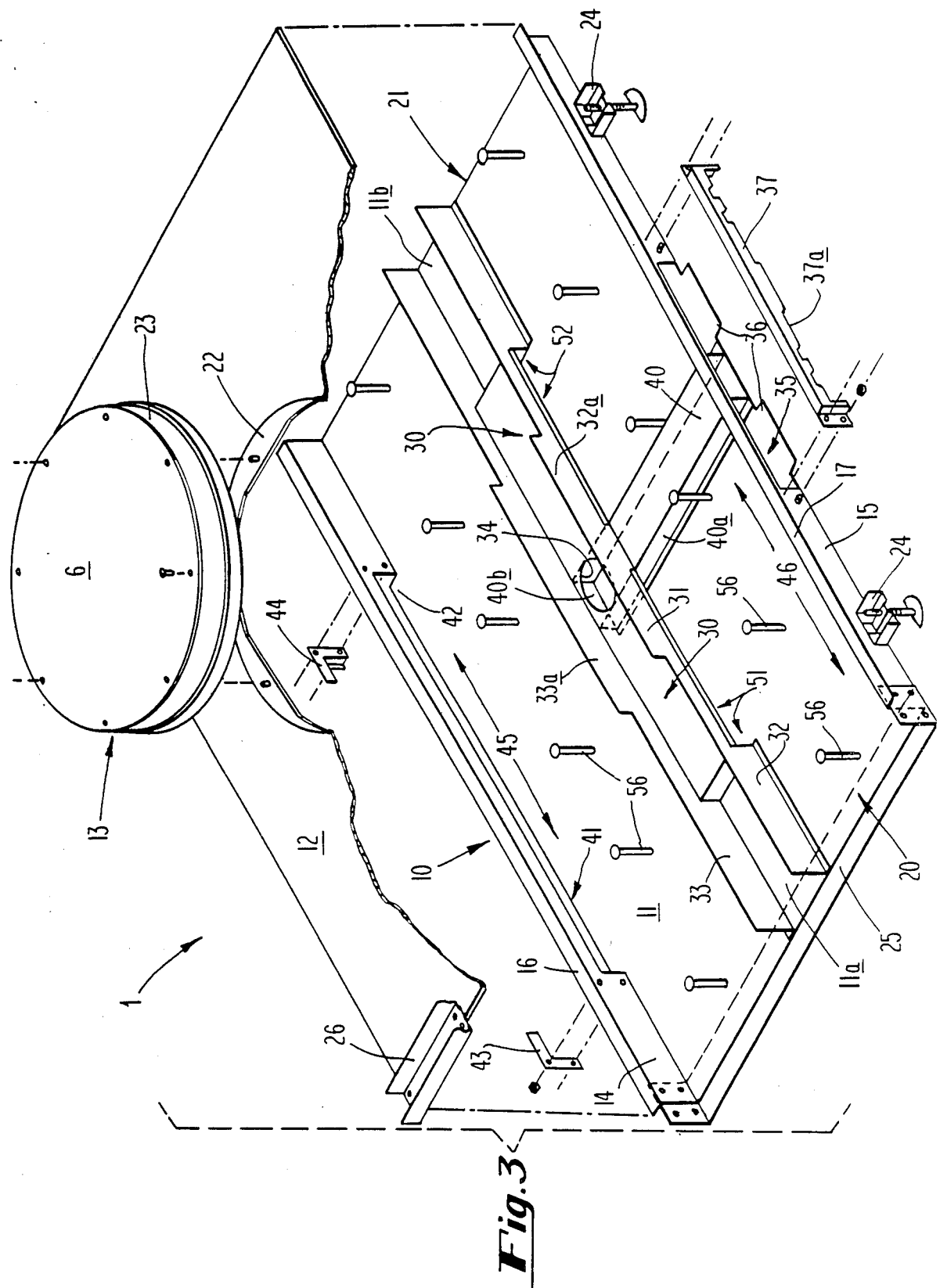
FIG. 3 is an exploded perspective view of the box of the invention adapted for connection to other boxes, for connection to a cellular raceway for distribution, and for connection to a closet to bring communication conductors (telephone and/or data) into the system and to serve both as part of the header run and as a junction box.

FIG. 4 is an exploded perspective view of the box of the invention adapted for connection to other boxes, for connection to a cellular raceway for distribution, and for connection to a closet to bring power conductors into the system and to serve both as part of the header run and as a junction box; and FIG. 5 is an exploded perspective view of the box of the invention adapted for connection to other boxes and for connection to cellular raceways for distribution and to serve both as a junction box and as part of the header run.

FIG. 1 illustrates a typical header duct type feeder system wherein junction boxes are interconnected by ducts 2 and 3. The junction boxes 1 have access cover plates 4. Such junction boxes 1 are spaced on approximately 4, 5, or 6 foot centers. In other words, the access covers appear in the floor surface at 4, 5, or 6 foot intervals.

The ducts numbered 2 are normally No. 4 ducts (being 4½ inches wide) and are used for telephone and/or data conductors. The ducts numbered 3 are normally No. 2 ducts (being 3½ inches wide) and are used for power conductors. Typically, the dimensions of the boxes 1 of FIG. 1 are approximately 24 inches by 24 inches for the largest capacity of conventional systems.

FIG. 2 illustrates how the invention replaces the conventional system. A plurality of boxes 5 are set up in end-to-end abutting relationship to form the header run and each serve as a junction box. The boxes have access cover plates 6. Each box has a length corresponding to the spacing required; i.e. 4, 5, or 6 feet. For example, if the electrical specifications required a spacing of 4 feet between access covers, each box of the invention would be 4 feet in length. Typically, the width of each box is 3 feet.

While the access covers appear on the floor at the conventional intervals, the capacity of the system is greatly increased as will be apparent from the description which follows.

First, referring to FIG. 3, the box 1 is formed as by a housing 10 comprised of a base 11 and top plate 12. The top plate 12 mounts the access unit 13 which has the cover plate 6.

The base 11 has upstanding side walls 14 and 15 respectively terminating in flanges 16 and 17 to which the top plate 12 is welded. This forms the housing into a hollow chamber the opposite ends 20 and 21 of which are open.

The access unit 13 is of conventional design and comprises a plaster ring 22 which is fixed to the cover, an adjusting ring 23 adjustably mounted in the plaster ring and carrying the cover plate 6. The box is mounted on the concrete subfloor by the adjustable support brackets 24.

Coupling means secures adjacent boxes together and this includes a strap 25 and a U-channel 26. The strap 25 is connected to the outside of base 11 and of side walls 14 and 15 and overhands the end 20 so as to form a cradle which supports the ends of the next box. The U-shaped channel 26 is connected to the edge of top plate 12 and is coextensive therewith and overhangs the edge so as to rest on the top plate of the next adjacent box. It will be observed that the strap 25 and channel 26 form a female socket to receive and support the end of the next adjacent box. The strip and channel 26 are secured by conventional means.

The box 1 of FIG. 3 is structured to receive communications conductors from a communication closet and direct some of the conductors to adjacent boxes (the header function) and to direct other such conductors to a distribution run (the junction box function). The structure will now be explained.

Centrally disposed along the base 11 is a header power raceway 30 which carries power conductors. The raceway 30 extends between the open ends 20 and 21 and has a raised center section 31 spaced away from the base 11. The walls 32 and 33 extend up from the base 11 to the underside of the top plate 12 and the extensions 33a and 32a extend up into the plaster ring 22 for purposes of enhancing electrical isolation. Centrally of the header power raceway 30 is an access opening 34.

The side wall 15 has a distribution opening 35. The base 11 is formed with a pair of support extensions 36. The extensions 36 are for supporting the underside of a distribution duct butted up against the side wall 15. The distribution duct preferably is a cellular raceway of the kind shown in my copending application Ser. No. 596,320 entitled Cellular Raceway filed Apr. 3, 1984.

A bridge member 37 is used for holding and positioning the distribution duct or cellular raceway on the support 36. The lower edge 37a of the bridge 37 has the shape of the distribution duct which is this case is the same as the cellular raceway of application Ser. No. 596,320. Conventional nut and bolt means secure the bridge to the side 15 and the clearance holes for the bolts are normally slotted to provide for vertical adjustment to accomodate distribution ducts of different heights. Set screws may be threaded on the opposite ends of the bridge and each turned in to engage a side of the cellular raceway. The set screws insure continuity of ground.

A distribution power raceway 40 is mounted on the base 11 and extends from the distribution opening 35 across the base and underneath the raised center section 31. At the opening 35 the raceway 40 is open and closed off at the end 40b. An access aperture (not shown) in the top of the raceway 40 is aligned with the access opening 34. These openings permit power conductors in the header power raceway 30 to be fed down into the distribution power raceway 40 and thence out to the power cell in the cellular raceway at the opening 35.

It will be observed that the header power raceway 30 in cooperation with the underside of the top plate 12 and the portions of the base 11a and 11b form an enclosed member (30) for carrying power conductors. Also, it will be noted that the distribution power raceway 40 in cooperation with the base forms an enclosed member for carrying power conductors. The conductors in these enclosed members are electrically isolated from the other open portions of the box.

The side wall 14 has a communications closet opening. The base 11 is formed with a support extension 42. The extension 42 is for supporting a header duct butted up against the side wall 14. The header duct (not shown) runs to a communications closet. Connectors 43 and 44 are used for holding the header duct on the support 42. Each connector is structured to engage the side and top of a header duct and is secured to the wall 14 by conventional nut/bolt means. The clearance holes for the bolt may be slotted to provide for vertical adjustment. Set screws may be threaded on the side of the connectors and each turned in to engage the sides of the header ducts and insure continuity of ground.

The base 11, the top 12, the side wall 14, and the side 33 of the header power raceway 30 form a communication header raceway 45 which extends between the open ends 20 and 21. Also, the base 11, the top 12, and the side wall 15 and the side 32 of the header power raceway 30 and the outside surface of the raceway 40 form a communication header raceway 46 which extends between open ends 20 and 21.

The base 11, the underside of the raised section 31, and the side 40a of the raceway 40 form a tunnel 51 between the communication header raceways 45 and 46. The base 11, the underside of the raised section 31, and the other side of the raceway 40 form a tunnel 52 between the communication header raceways.

It will be apparent that communication conductors coming out of the opening 41 from the closet headerduct can be directed along communication raceway 45 and out of one or both of the ends 20 and 21 and also can be directed through either tunnel 51 or 52 into the communication raceway 46 and thence out one or the other ends 20 and 21 or through opening 35 into the communication cells of the distribution duct connected to same.

Moreover, it will be apparent that the communication raceways 45 and 46 can serve as a means to convey communication conductors from one adjacent box to another adjacent box.

The box of FIG. 4 is structured to receive power conductors from a power closet and direct some of these conductors to adjacent boxes (the header function) and to direct others of such conductors to a power distribution run (junction box function). The structure will now be explained.

Before proceeding with the description it is pointed out that most components of the box shown in FIG. 3 also appear in the boxes shown in FIGS. 4 and 5. These common components have the same numerals in each Figure. The common components will not be explained in connection with FIGS. 4 and 5; only the modifications to adapt the box for purposes mentioned will be explained.

In the box of FIG. 4, the side wall 14 has a power closet opening 53 which is like the opening 41 but reduced in size. The base 11 is formed with a support extension 54 for supporting a headerduct butted up against the side wall 14. The headerduct (not shown) runs to a power closet. Connectors 43 and 44 are used to hold the headerduct on the support.

In the box of FIG. 4 the portion of the distribution power raceway 40 under the raised section 31 is modified so as to have a flared section 40c and further is modified with an extension which form a closet power raceway 40d butting up against the opening 54 and open to a closet headerduct also butted against the opening. The flared section 40c has an access aperture not shown in alignment with the access opening 34.

It will be understood that in the embodiment of FIG. 4 the outer surface of the closet power raceway 40d forms part of the communication header raceway 45.

It will be apparent that power conductors coming out of the opening 53 and into the closet power raceway 40d can be directed out through the access opening 34 into the header power raceway 30 and thence out one or both of the ends 20 and 21 or some of such conductors can be directed into raceway 40 and thence into the power cell of the distribution duct connected to opening 35. Also, it will be apparent that the header power raceway can serve as a means to convey power conductors from one adjacent box to another adjacent box.

The box shown in FIG. 5 is structured for use in the header run at positions other than at power or communications closet locations. The box of FIG. 5 functions as a header in transferring power and/or communication conductors from one adjacent box to another adjacent box and as a junction box in transferring conductors from the header run into distribution runs.

In FIG. 5 the wall 14 is modified by that it has a distribution opening 55 which is identical to the opening 35 and serves the same purpose. Further, in the box of FIG. 5 the distribution power raceway is modified with an extension 40e which extends between the distribution opening 55 and the header power raceway.

It will be apparent that power conductors in the header power raceway 30 can be directed through the box or directed down through the access opening 34 into the power raceways 40 and 40e and thence to the corresponding distribution ducts.

Before closing, it is pointed out that I provide a plurality of cover supports 56 which are appropriately spaced along the communication header raceways 45 and 46. These are to avoid cover deflection due to large loads.

I claim:

1. In a single level junction box/header:
a hollow housing the opposite ends of which are open for the passage of conductors;
access means on said housing for access to the interior of the housing;
means forming a header power raceway in the housing extending from one open end to the other open end for passage of power conductors;

means forming a pair of communication header raceways in the housing extending from one open end to the other open end for passage of communication conductors;

means forming a pair of tunnels for passage of communication conductors between said pair of communication header raceways;

means forming a distribution opening in said housing;

means adjacent said distribution opening to receive and support enclosed distribution duct means in alignment with the distribution opening for passage of power and communication conductors; and means forming a distribution power raceway in communication with said header power raceway and said distribution opening for the passage of power conductors.

2. A junction box/header comprising:

a base having upstanding side walls and a top plate supported on the side walls and extending across the base, the base, side walls, and cover forming a hollow chamber the opposite ends of which are open for passage of conductors;

access means on said top plate for access to said chamber;

coupling means on one end of the box for joining the box to an adjoining box;

means in said chamber forming a header power raceway for receiving power conductors extending from one end of the chamber to the other and including a center section spaced away from said base with the center section having an access opening for passage of power conductors;

a distribution opening in at least one of said side walls;

means adjacent said distribution opening to receive and support enclosed distribution duct means in alignment with said distribution opening for passage of power conductors and communication conductors;

means in said chamber forming a distribution power raceway for receiving power conductors and extending from said distribution opening underneath said center section and having an access aperture aligned with said access opening for passage of power conductors;

said base, said top, and said header power raceway forming a first communications header raceway extending between said open ends for passage of communication cables electrically isolated from power conductors in said power raceways;

said base, said top, said header power raceway, and the outer surface of said distribution power raceway forming a second communications header raceway for passage of communication cables electrically isolated from power conductors in said power raceways; and said base, said raised center section, and said distribution power raceway forming respectively a pair of tunnels for passage of communication cables between said first and second communication header raceways electrically isolated from power conductors in said power raceways.

3. The junction box/header of claim 2 wherein said coupling means comprises strap means on one end of the box and connected to said base and to said side walls and forming a cavity to accept an adjoining box.

4. The junction box/header of claim 2 wherein said coupling means further includes a U-shaped channel connected to said cover plate and having a portion extending outwardly to be connected to the cover plate of an adjoining box.

5. The junction box/header of claim 2 further including:

a power closet opening in the other of said side walls;

means adjacent said power closet opening to receive and support enclosed headerduct means from a power closet in alignment with said power closet opening;

said means forming said distribution power raceway providing that the portion of the distribution power raceway underneath said center section has a flared section and further providing an extension of same to form a closet power raceway which extends from said power closet opening to said flared section and electrically isolating power conductor therein from communication conductors in said first communications header raceway.

6. The junction box/header of claim 2 further including:

a communications closet opening in the other of said side walls; and means adjacent said communications closet opening to receive and support enclosed headerduct means from a communications closet in alignment with said communications closet opening for passage of communications conductors.

7. The junction box/header of claim 2 further including:

a second distribution opening in the other of said side walls;

means adjacent said second distribution opening to receive and support second enclosed distribution duct means in alignment with said second distribution opening for passage of power and communications conductors; and means in said chamber forming a second distribution power raceway for receiving power conductors and extending from said second distribution opening to first said distribution power raceway, the first said distribution power raceway being open to and aligned with the second distribution raceway for passage of power conductors.

* * * * *